(12) United States Patent
Noldus

(10) Patent No.: US 8,200,216 B2
(45) Date of Patent: Jun. 12, 2012

(54) METHOD FOR CONDITIONAL LOCATION RETRIEVAL

(75) Inventor: Rogier Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/126,530

(22) PCT Filed: Oct. 29, 2008

(86) PCT No.: PCT/EP2008/064688
§ 371 (c)(1),
(2), (4) Date: Apr. 28, 2011

(87) PCT Pub. No.: WO2010/048995
PCT Pub. Date: May 6, 2010

(65) Prior Publication Data
US 2011/0212734 A1    Sep. 1, 2011

(51) Int. Cl.
*H04W 88/02* (2009.01)
(52) U.S. Cl. ........................................ 455/433
(58) Field of Classification Search ............... 455/404.1, 455/413, 432.1, 433, 445, 456.2, 435.1; 707/769; 713/151; 370/328, 331, 352
See application file for complete search history.

(56) References Cited

U.S. PATENT DOCUMENTS

| | | | |
|---|---|---|---|
| 2006/0276226 A1* | 12/2006 | Jiang | 455/558 |
| 2008/0076412 A1* | 3/2008 | Khetawat et al. | 455/432.1 |
| 2008/0076420 A1* | 3/2008 | Khetawat et al. | 455/435.1 |
| 2010/0029272 A1* | 2/2010 | McCann et al. | 455/433 |

FOREIGN PATENT DOCUMENTS

| | | |
|---|---|---|
| WO | WO 02/03093 A | 1/2002 |
| WO | WO 03/005750 A | 1/2003 |
| WO | WO 03/024141 A | 3/2003 |

\* cited by examiner

*Primary Examiner* — Diane Mizrahi

(57) ABSTRACT

The invention discloses a method for obtaining a location of mobile station connected in a mobile network where a request for the location contains a condition specifying if a location stored in the mobile network can be used. The condition comprises an expression regarding an accuracy threshold for the location. When the stored location does not meet the condition the mobile network actively determines the location of the mobile station. The location is reported back. The method can be applied in a Home Location Register in the network, in a Visiting Mobile Service Center or in both. The HLR contains location information for registered mobiles and the VMSC for connected mobiles.

10 Claims, 7 Drawing Sheets

Figure 1:
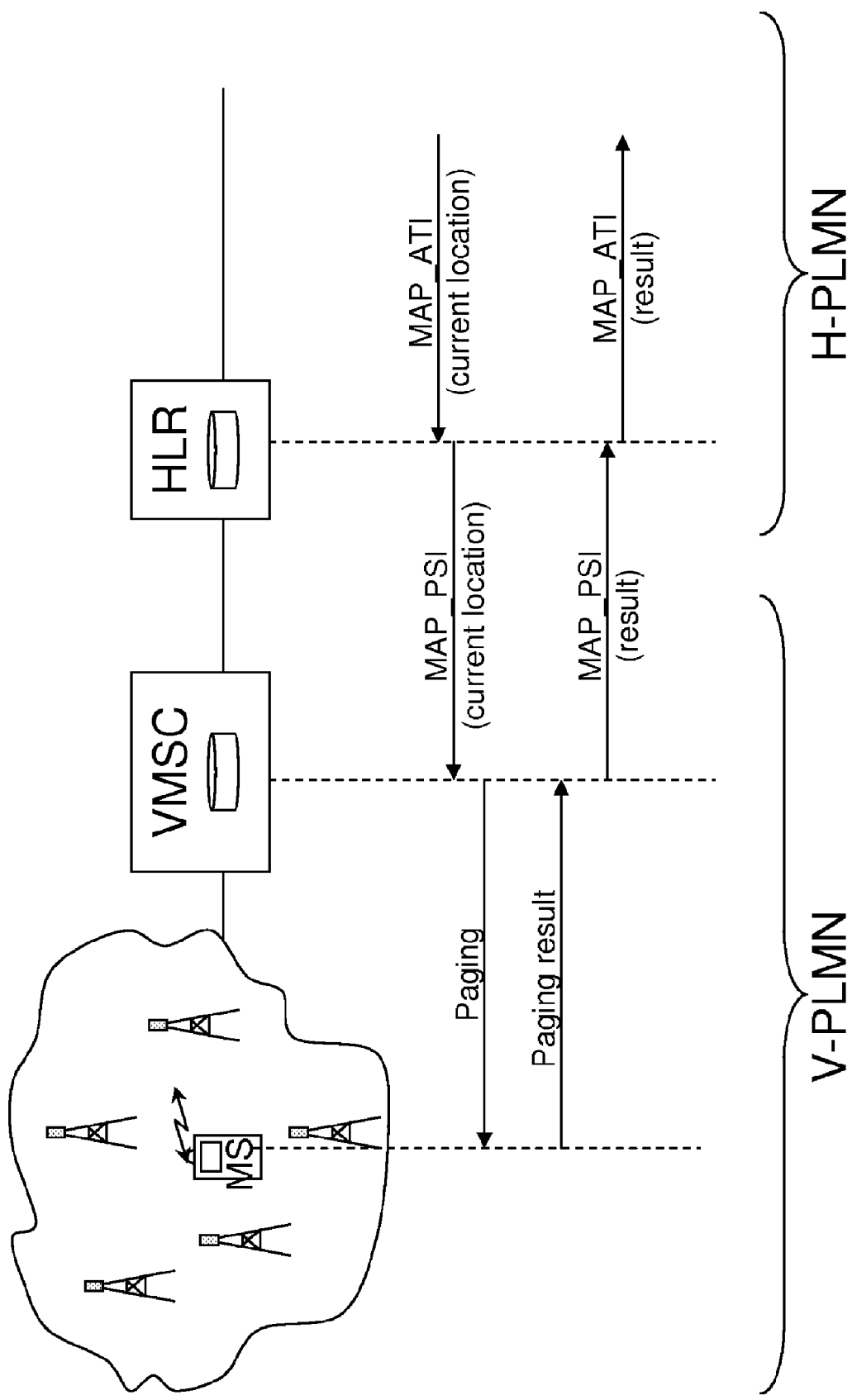

Standard MAP_ATI syntax definition.

```
anyTimeInterrogation OPERATION ::= {
  ARGUMENT
    AnyTimeInterrogationArg
  RESULT
    AnyTimeInterrogationRes
  ERRORS {
    systemFailure | ati-NotAllowed | dataMissing | unexpectedDataValue | unknownSubscriber}
  CODE  local:71 }                                                                                 --Timer m AnyTimeInterrogationArg ::= SEQUENCE {
  subscriberIdentity        [0] SubscriberIdentity,
  requestedInfo             [1] RequestedInfo,
  gsmSCF-Address            [3] ISDN-AddressString,
  extensionContainer        [2] ExtensionContainer       OPTIONAL,
  ...}

SubscriberIdentity ::= CHOICE {
  imsi      [0] IMSI,
  msisdn    [1] ISDN-AddressString
}

RequestedInfo ::= SEQUENCE {
  locationInformation       [0] NULL                                      OPTIONAL,
  subscriberState           [1] NULL                                      OPTIONAL,
  extensionContainer        [2] ExtensionContainer       OPTIONAL,
  currentLocation           [3] NULL                                      OPTIONAL,
  requestedDomain           [4] DomainType
                                                         OPTIONAL,
  imei       [6] NULL
  ms-classmark              [5] NULL                                      OPTIONAL,
  mnpRequestedInfo          [7] NULL                                      OPTIONAL}
```

-- *currentLocation shall be absent if locationInformation is absent*

Figure 6

Adaptation to MAP_ATI according to the invention

```
RequestedInfo ::= SEQUENCE {
    locationInformation        [0] NULL               OPTIONAL,
    subscriberState            [1] NULL               OPTIONAL,
    extensionContainer         [2] ExtensionContainer OPTIONAL,
    ...,
    currentLocation            [3] NULL               OPTIONAL,
    requestedDomain            [4] DomainType         OPTIONAL,
    imei            [6] NULL           OPTIONAL,
    ms-classmark    [5] NULL           OPTIONAL,
    mnpRequestedInfo           [7] NULL               OPTIONAL,
    accuracyCondition          [8] PagingCondition    OPTIONAL}
-- currentLocation shall be absent if locationInformation is absent
-- accuracyCondition shall be absent if currentLocation is absent accuracyCondition ::= SEQUENCE {
    ageThreshold   [0] INTEGER (0..86400)   OPTIONAL,
    speedThreshold [1] INTEGER (0..200)     OPTIONAL,
    granularity    [2] INTEGER (0..2)       OPTIONAL}
```

Age threshold is provided in seconds.
Speed threshold is provided in meters per second.
Granularity is provide as 0 low; cell id, 1 medium; triangulation, 2 high; GPS.

Figure 7

METHOD FOR CONDITIONAL LOCATION RETRIEVAL

TECHNICAL FIELD

The present invention relates to methods and systems for retrieving a location of a mobile terminal connected in a Public Land Mobile Network.

BACKGROUND

From 3GPP release R99 onwards service applications in a telecom network can request active location determination from the mobile terminal locating system in the Public Land Mobile Network (PLMN). Active location retrieval (ALR) is specified in CAMEL-Phase 3 as "current location retrieval". Details of ALR are given in 3GPP TS 23.078 and 3GPP TS 29.002. ALR is an enhancement to Any Time Interrogation (ATI) that was introduced in CAMEL Phase 1. ATI is part of the Mobile Application Part (MAP) protocol for communication between entities in the PLMN. MAP_ATI allows entities to get from the Home Location Register (HLR) specific details of a mobile subscriber such as subscriber location, subscriber state, mobile terminal registration number etc. The type of information requested is provided in the "RequestedInfo" field, see FIG. 6 showing a compilation of the MAP-ATI elements as presented in 3GPP TS 29.002. ALR is in fact requesting the option "currentLocation".

The flow of messages and involved entities is outlined in FIG. 1. The HLR receives the MAP_ATI from a requestor and detects the request for current location so it treats it further as an ALR. The mobile station (MS) for which the ALR is intended is identified by either IMSI or MSISDN. Where as the HLR is in the Home PLMN (H-PLMN), the mobile station is connected in a visited PLMN (V-PLMN) handled by the visited MSC (VMSC). The V-PLMN is the PLMN where the mobile station is currently connected and registered as being present. When a mobile station is in the H-PLMN, then the V-PLMN for that mobile station coincides at that moment with the H-PLMN for that mobile station. It shall be noted that the requestor does not need to be in the H-PLMN. The HLR acts on the ALR with sending a MAP-PSI (Provide subscriber info) towards the VMSC. MAP-PSI has the same RequestedInfo field as MAP-ATI in which the HLR copies the received "RequestedInfo" field from the MAP-ATI. The VMSC acts by paging the mobile station to obtain the current location.

Paging is to be understood as a variety of possibilities to obtain the actual position of the Mobile station. The mobile station can report the co-ordinates it has measured with its own (built-in) GPS, by means of enhanced triangulation (e.g. Difference in Time of Arrival, DToA), Radio direction finding system etc. Commonly the combination of the mobile station and network related equipment is addressed as locating system which is controlled by the VMSC. Inherent to all position measurements is that it requires radio air capacity as well as Radio access network (RAN) resources to perform and/or report measurements. For a more detailed view on methods for determination of a position of a mobile station, related measurements and calculations reference should be made to 3GPP TS25.305.

The paging result comprises the measured location reported directly to the VMSC by the mobile station or reported by a network based function. The VMSC forwards this information to the HLR with a MAP_PSI response message and the HLR forwards to the requestor in a MAP_ATI response. ALR offers in this way a good possibility to telecom services to obtain accurate position information of mobile stations. Problems however arise with the increasing amount of services that make use of position information. A few examples;

Location based charging; prior to connecting, the services checks the position of both mobiles, and if they are in the same area a reduced charging rate is used comparable to making a local call on the fixed telephone network.

Home zone charging; which reduces the charging rate, when you call from or being called in an area that is considered to be around your living address.

Find closest buddy. This is a service of the family and friends group which locates the closest mobile party on your personal Family & Friends list.

Exit/arrival SMS. This service monitors the location of a mobile and issues an SMS when a mobile station enters or leaves a defined area.

Another aspect is that services can be chained, meaning that find closest buddy is followed by local based charging and then by a prepaid service. Each of the services may perform a location request on their own.

The growing number of current location requests put a growing demand on already scarce radio air spectrum capacity and radio access network resources. Operators facing a growing demand for more air bandwidth due to more data traffic, mobile internet and mobile TV look for alternative methods to lower the impact of location requests on their radio air spectrum capacity and radio access network resources.

SUMMARY

The described invention provides a method of obtaining a location of a mobile station that is connected in a mobile network where the requestor includes with a location determination request for the mobile network a condition specifying when a location of a mobile station stored in the mobile network can be used or when the location shall be actively determined by the mobile network. The mobile network reports the location of the mobile back to the requestor.

In further detail the invention discloses a method of obtaining a location from a Visiting Mobile Service Centre (VMSC) of a mobile station that is connected to that VMSC in a mobile network where the VMSC receives a location determination request for a connected mobile station including a condition specifying when a location of a mobile station stored in the VMSC can be used or when this location shall be actively determined by the VMSC. The VMSC reports the location back.

Also in further detail the invention discloses a method of obtaining a location of a mobile station from a Home Location Register (HLR) where the mobile station is registered, where the HLR receives a location determination request for a registered mobile station including a condition specifying when a location of a mobile station stored in the HLR can be used or when this location shall be obtained from a Visiting Mobile Service Centre (VMSC) to which the mobile station is connected. The HLR reports the location back.

In an embodiment the invention discloses a Home Location Register (HLR) for registering mobile stations, said HLR having a transceiver for Mobile Application Part (MAP) messages, a store for subscriptions of registered mobile stations including location of those mobile stations and a processing means for handling MAP messages and maintaining the store of subscriptions characterised in that the processing means is specially adapted to receive a location determination request for a registered mobile station including a condition specifying when a location of a mobile station stored in the HLR can be used or when this location shall be obtained from a Visiting Mobile Service Centre (VMSC) to which the mobile station is connected to and the reporting back of the location of the mobile station.

In an other embodiment the invention discloses a Visiting Mobile Service Centre (VMSC) for handling connected mobile stations in a mobile network, having a location measurement controller for controlling determination of a location of a mobile station, a transceiver for Mobile Application Part (MAP) messages, a store for location of connected mobile stations and a processing means for handling MAP messages and maintaining the store of locations characterised in that the processing means is specially adapted to receive a location determination request for a connected mobile station including a condition specifying when a location of a mobile station stored in the VMSC can be used or when this location shall be actively determined by the VMSC and the reporting back of the location of the mobile station.

In further embodiment of the invention the request is performed by means of a Mobile Application Part—Any Time Interrogation (MAP-ATI) message towards the Home Location Register (HLR) or by a combination of a MAP-ATI message towards the HLR and a Mobile Application Part—Provide Subscriber Info (MAP-PSI) message towards the Visiting Mobile Service Centre (VMSC). The condition comprises an identifier for the presence of conditions being none, one or more of age threshold, speed threshold, and granularity.

FIGURES

Figure 2:
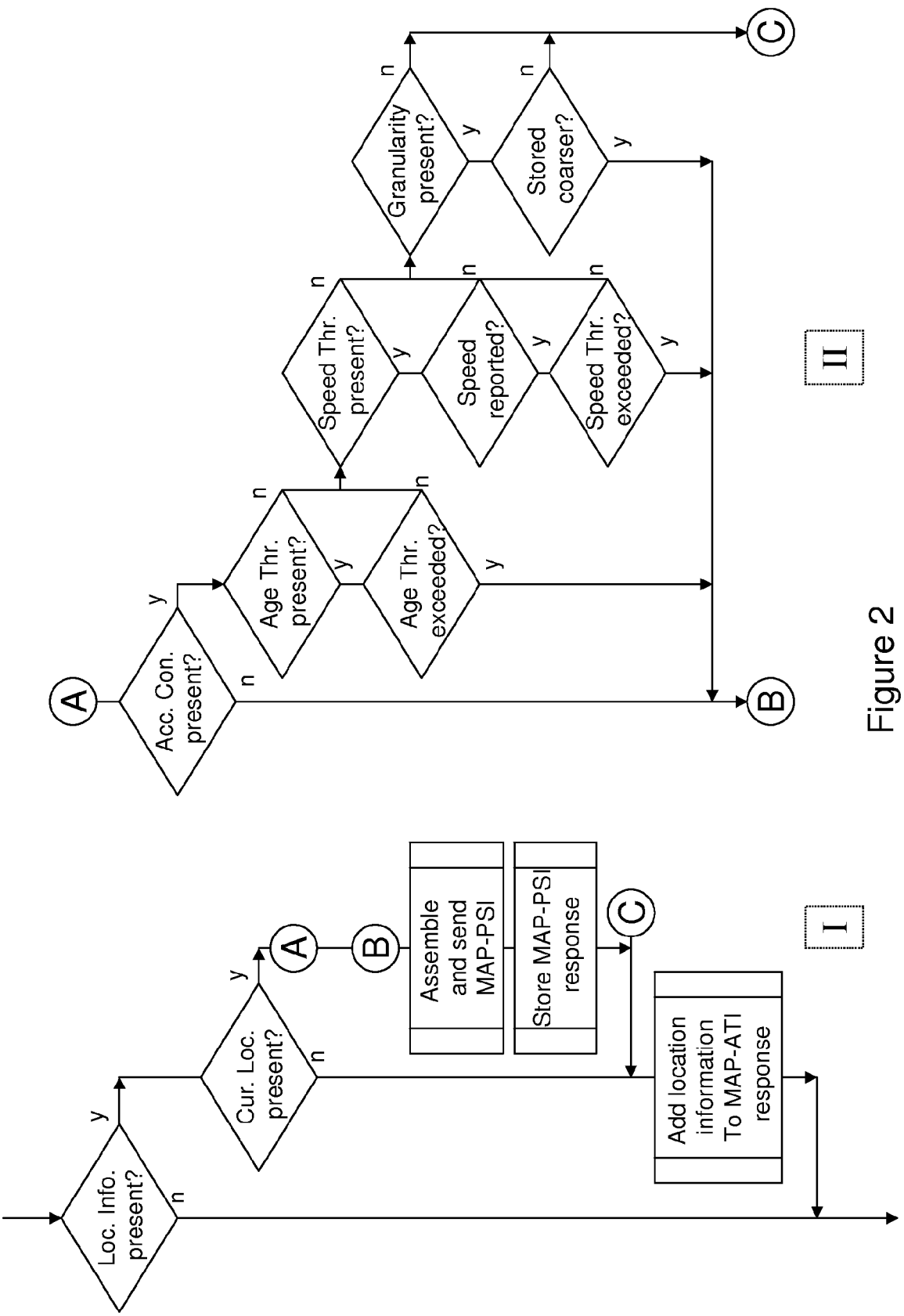
Figure 3:
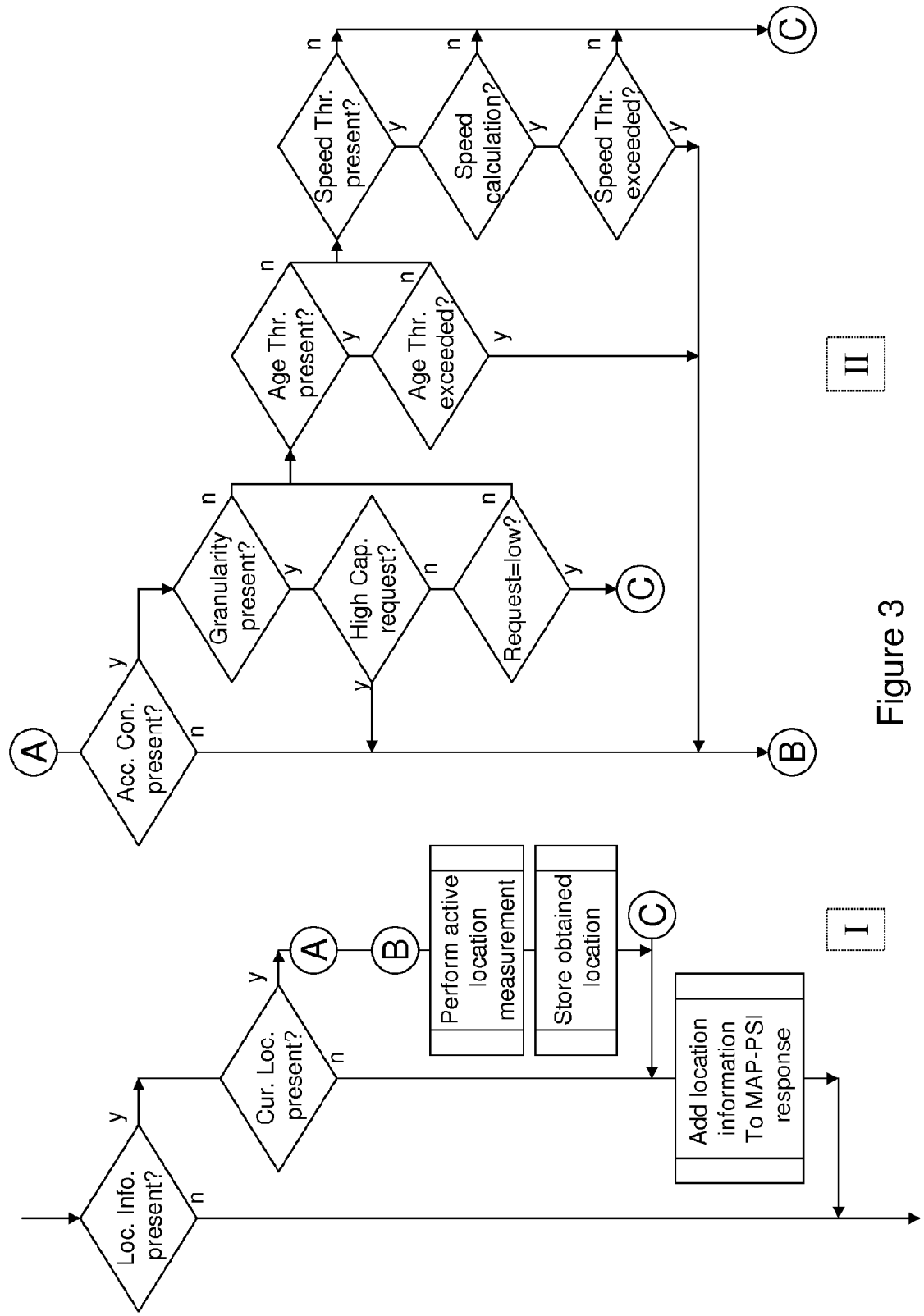
Figure 4:
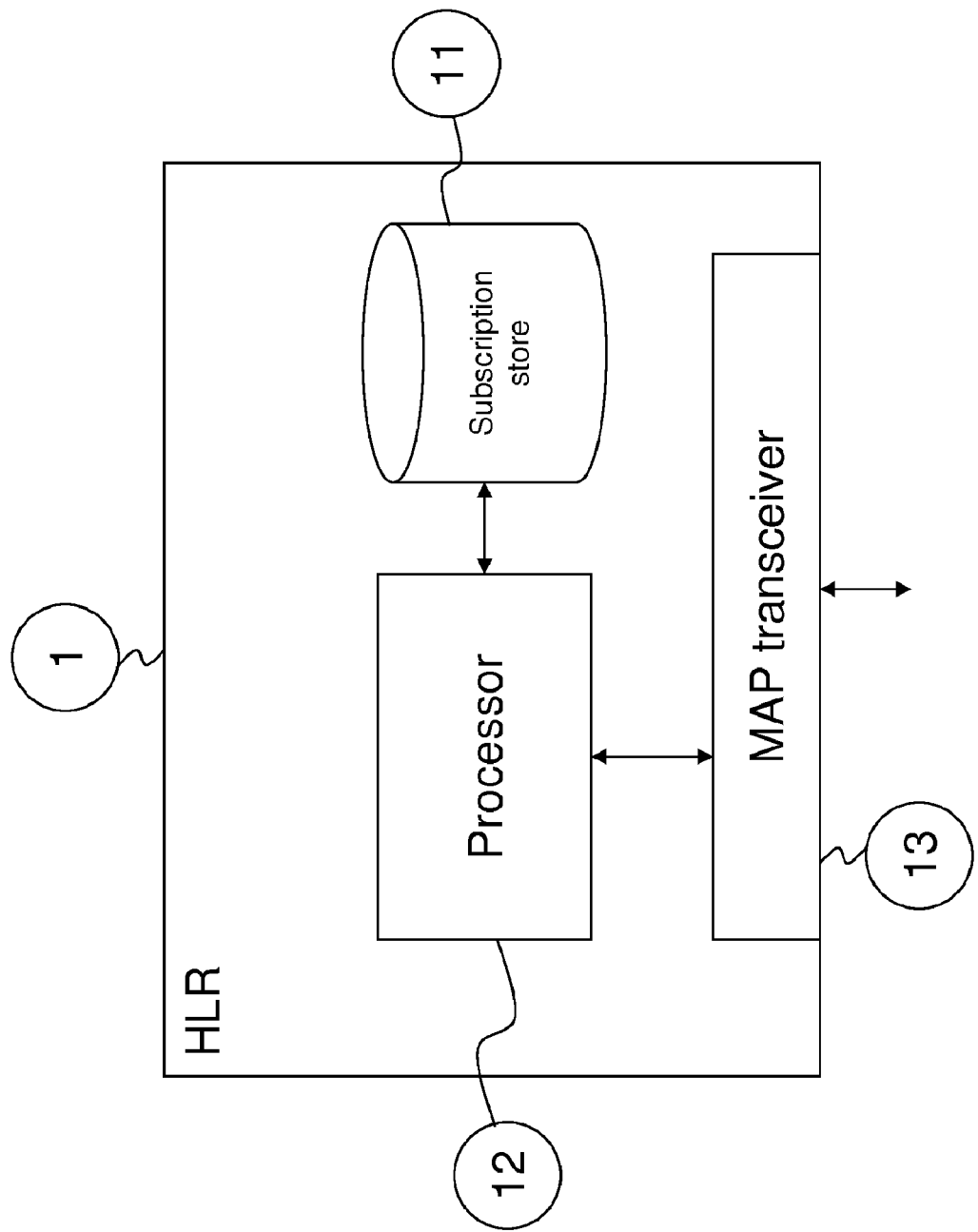
Figure 5:
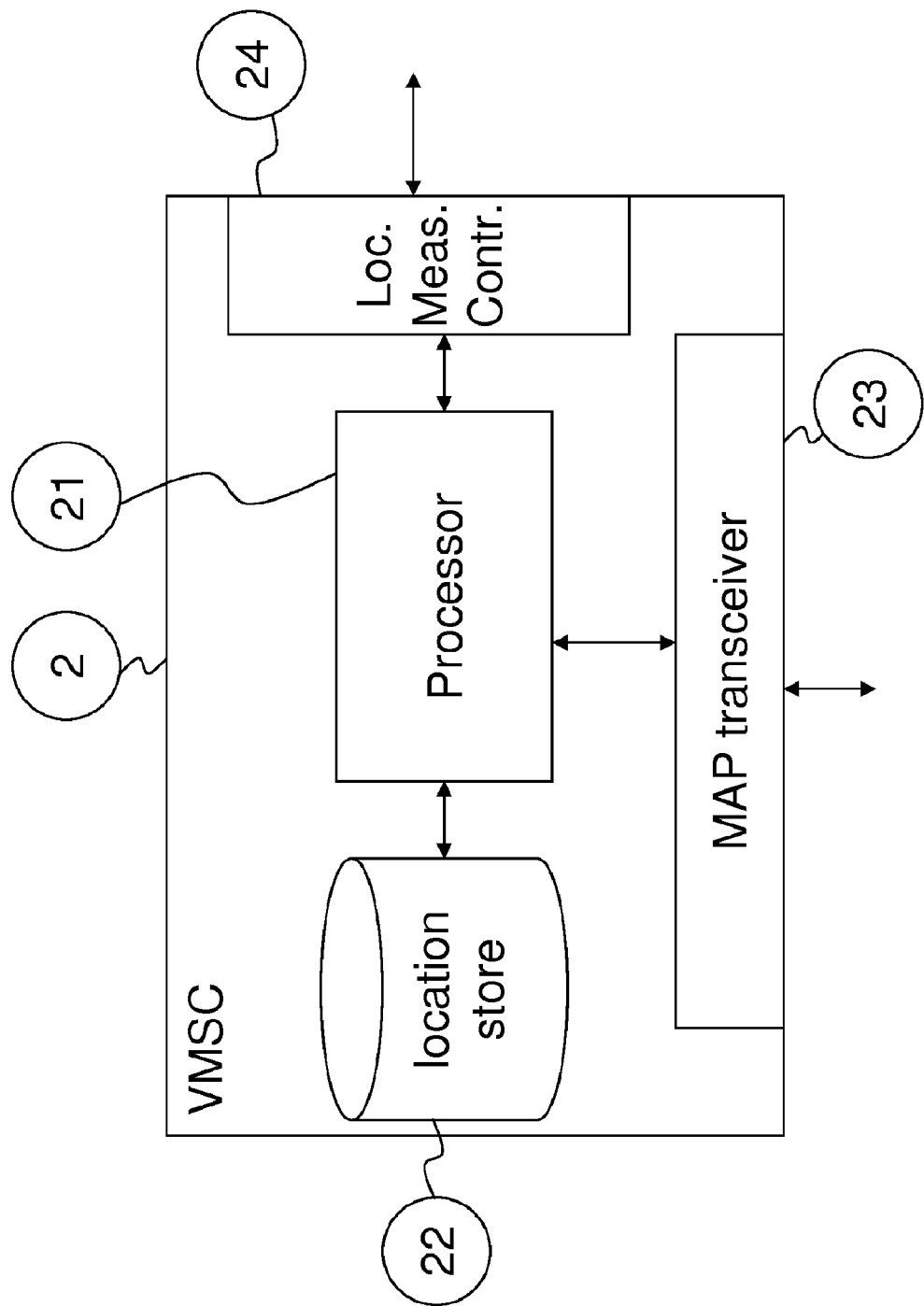

FIG. 1; state of the art active location request
FIG. 2; flow HLR implementation
FIG. 3; flow VMSC implementation
FIG. 4; Schematic HLR according to the invention
FIG. 5; Schematic VMSC according to the invention
FIG. 6; Standard MAP_ATI protocol
FIG. 7; Addition to MAP_ATI protocol according to the invention

DETAILED DESCRIPTION

As stated in the introduction the growing use of location information in telecommunication application and services increases load on MSC as well as consummation of radio spectrum capacity and Radio access network resources. Mobile network operators therefore are continuously looking for ways to reduce the paging impact on their system performance. Moreover most paging requests are generated outside the mobile network itself. The solution provided by the invention is to decrease radio spectrum usage, Radio access network usage, and to reduce MSC load, by not doing an active paging (position measurement) when an accurate position is already available. Core of this solution is that the requesting service or application can specify with what accuracy it needs the location information. If the current (already available) location information meets this accuracy, then active position measurement is not performed but instead the available location information is sent to the requestor.

Accuracy of location of a mobile requires some further elaboration as it involves multiple aspects.

First accuracy aspect is the granularity in providing position information of a mobile. The highest level and also the coarsest is the PLMN level. The PLMN level specifies that the mobile is connected in the home network or in a specific other network (mobile is roaming). Inside a PLMN a second level of the location area exist. The location area is related to a coverage area of a VMSC, although a VMSC may control multiple location areas. A much finer granularity is obtained with identified cell. This is the coverage area of a base station to which the mobile terminal is currently connected. Even finer granularity can be obtained by performing one of the triangulation methods or when the mobile terminal has an own or attached GPS receiver.

Second accuracy aspect is the age of the location information. The location information might be available but the accuracy of this location information depends on when it was obtained. When position information is stored also the timestamp of the reported position is stored. Age of location information only relates to cell level and finer location data. PLMN and Location Area (LA) information is always automatically updated when a mobile station is moving into another location area or PLMN.

Third accuracy aspect is the speed of movement of the mobile terminal. If the mobile terminal would be stationary the above age of reported location is not very interesting. When however fast moving, the location information is also outdating much faster.

In the solution provided by this invention the telecom service or application can specify a condition based on one or a mix of the above aspects for delivering the available location information or to perform actual location measurement.

As discussed in the background introduction location information is available in both the HLR and the VMSC. This allows for more than one type of implementation of the invention. First implementation is in the VMSC. The VMSC checks the available location information of a mobile terminal against the conditions stated in the request and decides to perform an active location measurement or not. This provides the reduction of VMSC load, the reduction of Radio access network load, and the reduction of radio spectrum usage. Second is the implementation in the HLR. It has the advantage that reaction time to the requesting services and applications is much faster when information can be delivered by the own HLR without the detour via VMSC and active location measurement. In second instance it has also the same effect as implementation in the VMSC itself. It reduces the VMSC load (even much more than with VMSC implementation) and also radio spectrum usage. Finally the invention can be implemented in both VMSCs and HLR which provides the advantage of reduction if other network HLRs request own VMSCs (other network subscribers roaming in own network) or other network services and applications request the own network HLR (own network subscribers roaming in other networks) Implementation in both HLR and VMSCs of the own network has the additional advantage that it can handle situations where a VMSC might have more accurate location information than the HLR as there is no obligation to automatically report finer details than PLMN and LA (MSC address).

MAP-ATI Changes

Independent of the actual implementation the service or application needs to specify the condition in the MAP-ATI request. To allow requesting services to specify accuracy, an addition is made to the possibilities in the "RequestedInfo" field of the MAP_ATI message. Next to "location information" (providing the last reported position as stored) and "current location" (provides that an active location measurement is done and will deliver the most actual and accurate position) an intermediate option "accuracyCondition" is provided, that allows the requestor to set conditions when requesting "current location". As result of evaluating the condition against the available (stored) location information the stored location is returned in the response when the condition is met. See FIG. 7. The actual content of "accuracyCondition" is up to 3 parameters where the requesting service may use 1, 2 or 3 in any combination.

The first parameter "granularity" relates to the granularity aspect as discussed above. In fact the PLMN and location area can be obtained by using "locationInformation" only as this information is always the most up to date available and there is no reason to request "current location". With the granularity parameter the requesting service can specify one of the others as shown in the table below. If the granularity of the stored location information is finer then the requested granularity, the stored location information is reported.

TABLE 1

|        | Value | method        |
|--------|-------|---------------|
| Low    | 0     | Cell ID       |
| Medium | 1     | Triangulation |
| High   | 2     | GPS           |

The second parameter is "ageThreshold". The parameter relates to the timestamp of the available location information. The requesting service can set a value from 0 to 84600 seconds (up to 24 hours). Setting value zero is forcing active location measurement. Any other value will be compared to the difference between time stamp and current time. If the difference (age of the stored location information) is less than the provided age threshold, then the stored location information is reported The third parameter is "speedThreshold". This parameter can be used to limited applicability of the other parameters. The requesting service can set a value from 0 to 200 meters per second. If the previously reported movement of the terminal as stored is lower then the speed threshold, the stored location information is reported.

If more than one parameter is used the outcome of the conditions is "and-ed" to the final decision. It might be clear from the previous that an actual implementation could be limited to one or two of above mentioned parameters. Most simple implementation would be to use only the "ageThreshold" parameter. On the other hand a person skilled in the art could add other conditions in the same way.

HLR Implementation

The implementation in the HLR comprises an addition to the routine for handling incoming MAP-ATI messages. The addition is outlined in FIG. 2. Standard the HLR checks the presence of request identifiers one by one and when present assembles the requested information into the MAP-ATI response and returns this to the requestor. The MAP-ATI request may contain various information requests. For the invention only those related to location are discussed.

Again state of the art the HLR checks for presence of "locationInformation". If present the HLR checks if "currentLocation" is present. If not the available location information is added to the MAP-ATI response. If present then a MAP-PSI is assembled and sent to the applicable VMS C. When the HLR receives the MAP-PSI response back from the VMSC the information is stored so updating local information. Then the HLR adds the available (now updated) location information to the MAP-ATI response. This indicated in roman I of FIG. 2

Whit the addition according to the invention (as indicated by roman II) the HLR performs an additional check when both "locationInformation" and "currentLocation" are present. The HLR checks if "accuracyCondition" is present. If not present the HLR will act as before.

If present then the HLR starts analysing the provided condition parameters against the stored location information.

If "ageThreshold" parameter is present then the HLR compares time past since the timestamp of the stored location information with the value of the "ageThreshold" parameter. If this exceeds the value then the HLR continues with assembling the MAP-PSI as before. No other parameters are checked. When "ageTreshold" is not present or it value is not exceeded the HLR continues with checking for presence of the "speedThreshold" parameter.

If the "speedThreshold" parameter is present a further check is made if speed (velocity of mobile) is reported by the VMSC. Velocity is optional and not every VMSC may report this. If reported the reported speed is compared with the value of the "speedThreshold" parameter. If the value is exceeded then the HLR continues with assembling the MAP-PSI as before and no further parameters are checked. If the "speedThreshold" parameter is not present or speed is not reported or the "speedThreshold" parameter value is not exceeded, the HLR continues with checking "granularity".

If the "granularity" parameter is present, then the HLR compares the reported measurement type with the requested "granularity". If the requested "granularity" is finer then the reported measurement type (e.g. High meaning GPS is requested and reported is low meaning cellID) then the HLR continues with assembling the MAP-PSI as before. If the reported granularity is finer then the HLR continues as when "granularity" was not present.

It might be clear when "accuracyCondition" is present but no parameters are provided, will result in responding with the stored location information, whilst when omitting "accuracyCondition" will result in active location retrieval.

Further referring to FIG. 4 a schematic drawing is given of the HLR for the purpose of the invention. The HLR 1 comprises a subscription store 11 where subscription details are stored for mobile stations that are registered with this HLR. With the subscription also the last reported location of the mobile station is stored. The HLR further comprises a MAP transceiver 13 enabling the HLR to send and receive MAP messages through the SS7 network. Core of the HLR is the processor 12. The processor is driven by incoming messages. The standard function of the processor, being handling of messages received, is adapted with a special routine for handling messages that contain an accuracy condition.

VMSC Implementation

The VMSC implementation is comparable but not identical to that of the HLR implementation. VMSC implementation is an addition in the handling routine for MAP-PSI messages. The addition is outlined in FIG. 3. As with MAP-ATI, the MAP-PSI may contain several information requests. As for the HLR for the purpose of the invention, only the requests for location information are considered. The VMSC reports the requested information back in a MAP-PSI response to the requestor.

State of the art (as indicated by roman I in FIG. 3) the VMSC checks for presence of "locationInformation". If present the VMSC checks if "currentLocation" is present. If not, the stored location information in the VMSC is added to the MAP-PSI response. If both are present, then an active location measurement of the mobile station is performed. The obtained location information is stored locally in the VMSC. The VMSC copies the stored location information into the MAP-PSI response. The response is send back to the requestor.

With the addition according to the invention (as outlined by roman II) the VMSC performs an additional check when both "locationInformation" and "currentLocation" are present.

The VMSC checks if "accuracyCondition" is present. If not present the VMSC will act as before.

If present then the VMSC starts analysing the provided condition parameters against the stored location information.

If the "granularity" parameter is present, the value of that parameter is compared with the measurement type of the stored location information. The VMSC will perform an active position measurement without further checks when;
 a High precision is requested and the mobile station has GPS capability and stored location information is low or medium precision,
 a Medium precision was requested and the measurement type of the stored location is Low.

If low precision is requested then the VMSC continues directly with assembling the response based on the stored position information. Reason is that the cellID is continuously updated in the VMSC and active measurement will not enhance that. In all other cases the VMSC continues with checking for presence of "ageThreshold".

If the "ageThreshold" parameter is present, than the VMSC compares time past since the timestamp of the available information with the value of "ageThreshold". If this exceeds the value then the VMSC continues with performing an active location measurement. No other parameters are checked. When "ageTreshold" is not present or its value is not exceeded the VMSC continues with checking for presence of "speedThreshold".

If the "speedThreshold" parameter is present, the VMSC makes a further check if speed (velocity of mobile) is calculated by the VMSC. Velocity is optional and not every VMSC may calculate this. If calculated, the reported speed is compared with the value of "speedThreshold". If the value is exceeded then the VMSC continues with performing an active location measurement. If "speedThreshold" is not present or speed is not calculated or "speedThreshold" value is not exceeded, then the VMSC continues with assembling the MAP-PSI response as outlined before. When performing an active position measurement of the mobile the method of measurement is steered by the value of "granularity" for as far the method is supported by the VMSC and the mobile station. Like the HLR also the VMSC stores the latest measurement for possible reuse. Further referring to FIG. 5 a schematic drawing is given for the VMSC 2 for the purpose of the invention. Processor 21, location store 22 and MAP transceiver 23 have comparable functions as mentioned before for the HLR. Only difference is now that where the HLR contains subscription information and handles messages related to mobile terminals registered, the VMSC does that for mobile connected to the VMSC via the radio network. For the purpose of the invention the VMSC has one additional function over the HLR; a location measurement controller 24. This function in the VMSC steers active location determination as well as it performs required calculations. The processor orders an active location determination from the location measurement controller that returns location information.

To a person skilled in the art it might be clear from the described invention that it allows a multitude of location dependent services (e.g. location based charging, home zone charging, find closest buddy, entry exit message, locate person and many others) to be deployed in a telecom network without endangering radio network capacity needed for regular communication as voice video and data.

The invention claimed is:

1. A method of a telecommunication service retrieving a location of a mobile station connected in a mobile network, comprising the steps of:
 receiving, by a device in the mobile network, a request for current location, wherein the request includes a condition;
 checking, by the device in the mobile network, whether a current stored location in the mobile network of the mobile station meets the condition by the mobile network,
 reporting, by the device in the mobile network, the current stored location back to the requesting service when the condition is met,
 measuring, by the device in the mobile network, a location of the mobile station and reporting back to the requesting service when the condition is not met.

2. The method according to claim 1 where the mobile network deploys at least one Visiting Mobile Service Centre (VMSC), wherein the VMSC to which the mobile station is connected performs the steps comprising:
 receiving the request for current location determination including a condition,
 checking whether the current stored location in the VMSC of the mobile station meets the condition by the VMSC,
 reporting the current stored location back when the condition is met,
 measuring a location of the mobile station and reporting back when the condition is not met.

3. The method according to claim 2 where the request is contained in a Mobile Application Part—Provide Subscriber Info (MAP-PSI) message and the reported location is included in a MAP-PSI response message.

4. The method according to claim 2 where the condition is overruled by the VMSC when the request contains a granularity condition with value LOW.

5. The method according to claim 1 where the mobile network deploys at least one Home Location Register (HLR) connected to at least one Visiting Mobile Service Centre (VMSC), wherein the HLR where the mobile station is registered performs the steps comprising:
 receiving the request for current location determination including a condition,
 checking whether the current stored location in the HLR of the mobile station meets the condition,
 reporting the current stored location back, when the condition is met,
 forwarding the request to the VMSC where the mobile station is currently connected to and reporting back the location received from the VMSC, when the condition is not met.

6. The method according to claim 5 where the request is contained in a Mobile Application Part—Any Time Interrogation (MAP-ATI) message and the reported location is included in a MAP-ATI response message.

7. The method according claim 1 where the condition comprises a condition identifier and none or more of the following conditions:
 age threshold,
 speed threshold and
 granularity.

8. A Home Location Register (HLR) for registering mobile stations, the HLR comprising:
 a transceiver adapted for Mobile Application Part (MAP) messages,
 a store adapted for subscriptions of registered mobile stations including location of those mobile stations and
 a processor adapted for handling MAP messages and maintaining the store of subscriptions
 wherein the processor is specially adapted to perform the steps:

receiving a request for current location determination including a condition, checking whether a current stored location in the HLR of the mobile station meets the condition, reporting the current stored location back, when the condition is met, forwarding the request to a Visiting Mobile Service Centre (VMSC) where the mobile station is currently connected to and reporting back the location received from the VMSC, when the condition is not met.

9. A Visiting Mobile Service Centre (VMSC) for handling connected mobile stations in a mobile network, the VMSC comprising:

a location measurement controller adapted for controlling determination of a position of a mobile station, a transceiver adapted for Mobile Application Part (MAP) messages, a store adapted for location of connected mobile stations and a processor adapted for handling MAP messages and maintaining the store of locations wherein the processor adapted is specially adapted to perform the steps:

receiving a request for current location determination including a condition, checking whether a current stored location in the VMSC of the mobile station meets the condition by the VMSC, reporting the current stored location back when the condition is met, measuring a location of the mobile station and reporting back when the condition is not met.

10. A non-transitory computer-readable medium encoded with program instructions that are operable, when executed by a processor, to perform the steps comprising:

receiving a request for current location determination including a condition, checking whether a current stored location in a Visiting Mobile Service Centre (VMSC) of the mobile station meets the condition by the VMSC, reporting the current stored location back when the condition is met, measuring a location of the mobile station and reporting back when the condition is not met.

* * * * *

UNITED STATES PATENT AND TRADEMARK OFFICE
CERTIFICATE OF CORRECTION

PATENT NO. : 8,200,216 B2  
APPLICATION NO. : 13/126530  
DATED : June 12, 2012  
INVENTOR(S) : Noldus Page 1 of 1

It is certified that error appears in the above-identified patent and that said Letters Patent is hereby corrected as shown below:

In Column 4, Line 44, delete "VMS Cs" and insert -- VMSCs --, therefor.

In Column 4, Line 46, delete "VMS Cs" and insert -- VMSCs --, therefor.

In Column 4, Line 49, delete "networks)" and insert -- networks). --, therefor.

In Column 5, Line 57, delete "VMS C." and insert -- VMSC. --, therefor.

In Column 6, Line 8, delete ""ageTreshold"" and insert -- "ageThreshold" --, therefor.

In Column 7, Line 25, delete ""ageTreshold"" and insert -- "ageThreshold" --, therefor.

Signed and Sealed this  
Twenty-third Day of October, 2012

David J. Kappos  
*Director of the United States Patent and Trademark Office*